United States Patent
Piccirillo et al.

(10) Patent No.: US 12,397,876 B2
(45) Date of Patent: Aug. 26, 2025

(54) SUPPORT DEVICE FOR SUPPORTING A DISC BRAKE CALIPER AND AN ABS SYSTEM OF A BICYCLE

(71) Applicant: BLUBRAKE S.P.A, Milan (IT)

(72) Inventors: Giuseppe Piccirillo, Milan (IT); Mattia Tabai, Milan (IT); Fabio Todeschini, Milan (IT)

(73) Assignee: BLUBRAKE S.P.A., Milan (IT)

( * ) Notice: Subject to any disclaimer, the term of this patent is extended or adjusted under 35 U.S.C. 154(b) by 348 days.

(21) Appl. No.: 17/999,055

(22) PCT Filed: Jun. 17, 2021

(86) PCT No.: PCT/IB2021/055351
§ 371 (c)(1),
(2) Date: Nov. 17, 2022

(87) PCT Pub. No.: WO2021/255680
PCT Pub. Date: Dec. 23, 2021

(65) Prior Publication Data
US 2023/0211850 A1    Jul. 6, 2023

(30) Foreign Application Priority Data
Jun. 18, 2020    (IT) .................. 102020000014680

(51) Int. Cl.
*B60T 8/17*    (2006.01)
*B60T 8/176*   (2006.01)
(Continued)

(52) U.S. Cl.
CPC .............. *B62L 1/00* (2013.01); *B60T 8/1706* (2013.01); *B60T 8/176* (2013.01); *B62L 3/023* (2013.01);
(Continued)

(58) Field of Classification Search
CPC .......... B62L 1/00; B62L 3/023; B60T 8/1706; B60T 8/176; B60T 2270/10; F16D 65/0056; F16D 55/22; F16D 2055/0008
(Continued)

(56) References Cited

U.S. PATENT DOCUMENTS 6,435,318 B1 *  8/2002  Chen .................. B62L 3/023
                                              188/344
6,659,234 B1    12/2003  Huang
(Continued)

FOREIGN PATENT DOCUMENTS

CN      2100775 U       4/1992
DE   102019100172 A1    8/2019
(Continued)

OTHER PUBLICATIONS

International Search Report and Written Opinion of International Application No. PCT/IB2021/055351 mailed on Sep. 2, 2021, 12 pages.

*Primary Examiner* — Christopher P Schwartz
(74) *Attorney, Agent, or Firm* — Heslin Rothenberg Farley and Mesiti, PC; Victor A. Cardona, Esq.

(57) ABSTRACT

A disc brake caliper and the body of an ABS system are mounted on a fork arm of a bicycle by means of a single adapter support that can be removably connected to the fork arm, and configured to removably support both the caliper body of the disc brake and the ABS system.

7 Claims, 6 Drawing Sheets

(51) Int. Cl.
  *B62L 1/00* (2006.01)
  *B62L 3/02* (2006.01)
  *F16D 65/00* (2006.01)
  *F16D 55/00* (2006.01)
  *F16D 55/22* (2006.01)

(52) U.S. Cl.
  CPC ...... *F16D 65/0056* (2013.01); *B60T 2270/10* (2013.01); *F16D 2055/0008* (2013.01); *F16D 55/22* (2013.01)

(58) Field of Classification Search
  USPC .............................. 188/24.11, 24.22, 26, 344
  See application file for complete search history.

(56) References Cited

U.S. PATENT DOCUMENTS

| | | | |
|---|---|---|---|
| 6,945,369 B1 * | 9/2005 | Chen ....................... | B62L 1/005 188/26 |
| 8,936,136 B2 * | 1/2015 | Thomas .............. | F16D 65/0056 188/73.31 |
| 2004/0188186 A1 * | 9/2004 | Chen ........................ | B62L 1/00 188/26 |

FOREIGN PATENT DOCUMENTS

| | | |
|---|---|---|
| JP | H05105054 A | 4/1993 |
| WO | 2019159029 A1 | 8/2019 |

* cited by examiner

SUPPORT DEVICE FOR SUPPORTING A DISC BRAKE CALIPER AND AN ABS SYSTEM OF A BICYCLE

CROSS REFERENCE TO RELATED APPLICATIONS

This application is a national stage filing under Section 371 of International Application No. PCT/IB2021/055351, filed Jun. 17, 2021, published in English on Dec. 23, 2021, as WO 2021/255680 and which claims priority from Italian Patent Application No. 102020000014680 filed on Jun. 18, 2020, the entire disclosures of which are incorporated herein by reference.

FIELD OF THE INVENTION

The present invention relates in general to bicycles and—in particular—to bicycles equipped with a hydraulic braking system including an ABS system of the hydraulic type, operatively interposed between a master cylinder, associated with a bicycle brake lever, and a hydraulic cylinder actuating the caliper of a disc brake associated with a bicycle wheel, for example, the front wheel. The ABS system is configured to reduce the pressure of the fluid supplied to the actuating cylinder of the brake caliper when, during braking, a tendency to wheel locking and/or an incipient overturning of the vehicle is detected.

PRIOR ART

It has already been proposed in the past (see, for example, WO 2019/159029 A1) to mount an ABS system associated with the front wheel of a bicycle on an arm of the front fork of the bicycle. In this known solution, the body of the ABS system is clamped directly on an arm of the front fork, which means that the mounting system is configured according to each specific fork configuration. On the other hand, it would be desirable to propose a solution that can be applied to any type of fork and bicycle, without requiring any adaptation. Moreover, the aforesaid known solution does not allow carrying out of the assembling operation of the ABS system simply and quickly. It would also be desirable that the ABS system could be located in a position closer to the disc brake caliper associated with the front wheel of the bicycle, in order to simplify the arrangement of the communication duct between the ABS system and the actuating cylinder of the brake caliper. Finally, it would be desirable that the assembling operation of the ABS system can be carried out quickly and easily.

The document JPH05105054A illustrates a bicycle fork arm on which both a disc brake caliper associated with a bicycle wheel and the body of an ABS system of the hydraulic type are mounted. However, the support system illustrated in this document provides distinct and separate supports for mounting the disc brake caliper and the ABS system.

Document U.S. Pat. No. 6,659,234 B1 shows a mechanical type ABS system which—by its nature—is necessarily integrated into the mechanical control of the disc brake caliper. This solution is obviously not applicable in the case of hydraulic ABS systems.

Solutions are also known from CN 210 07 75 U and DE 10 2019 10012 A1.

OBJECT OF THE INVENTION

It is, therefore, an object of the present invention to associate an ABS system of the hydraulic type with the front fork of a bicycle by mounting the ABS system in a position close to the disc brake caliper, and providing a mounting system that is independent of the configuration of the front fork.

Another object of the invention is to enable an extremely simple and rapid assembling of the ABS system on the bicycle.

Another object of the invention is to provide an assembling of the ABS system on the bicycle that requires extremely simple and low-cost components.

Yet another object of the invention is to provide a mounting of the ABS system on the bicycle that also makes the connection operations between the ABS system and the actuating cylinder of the disc brake caliper associated with the front wheel of the bicycle extremely simple and easy.

SUMMARY OF THE INVENTION

In order to achieve one or more of the aforesaid objects, the invention is directed to a support device, configured to support—on a fork arm of a bicycle—both a caliper of a disc brake associated with a bicycle wheel, and an ABS system in the form of a hydraulic control device, intended to be operatively interposed between a master hydraulic cylinder associated with a bicycle lever for actuating the brake and an actuating cylinder of the brake caliper, in order to control and reduce the fluid pressure supplied to the cylinder brake caliper actuator when a tendency to wheel locking and/or an incipient overturning of the bicycle is detected during braking, wherein said support device comprises:
at least one first connection portion for connecting to a bicycle fork arm, and
at least one second connection portion for connecting to the body of a disc brake caliper, and
at least one third connection portion configured for connection to said ABS system,
said support device being characterized in that said at least one first connecting portion, said at least one second connecting portion and said at least one third connecting portion are all part of a single adapter support which can be removably connected to the fork arm, and configured to removably support both the caliper body of the disc brake and the ABS system.

In a preferred embodiment, said single adapter support has said at least one first connection portion that has at least one hole for engagement of a screw to attach the adapter support to the fork arm of the bicycle. Said at least one second connection portion of the adapter support has at least one hole for engagement of a screw to attach the body of the disc brake caliper to the adapter support. Said at least one third connection portion of the adapter support has at least one hole for engagement of a screw to attach a body of said ABS system to said adapter support.

Preferably, in the aforesaid preferred embodiment, the body of the adapter support is in the form of an elongated bar, with an upper end head and a lower end head (with reference to the condition mounted on a fork arm). Each of the two end heads has a first hole for engagement of a screw for attaching the adapter support to the fork arm of the bicycle, a second hole for engagement of a screw for attaching the body of the disc brake caliper to the adapter support, and a third hole for engagement of a screw for attaching a body of said ABS system to said support. In one example, the axis of the aforesaid third hole is substantially orthogonal to the axis of the aforesaid first hole.

According to another preferred characteristic, the support device according to the invention also comprises an auxiliary adapter, configured to be mounted on the body of the ABS system and to be connected to said adapter support, in such a way as to act as a connecting element between the adapter support and the body of the ABS system.

The invention has a number of advantages. First of all, the solution of the invention may be applied to any bicycle, regardless of the configuration of the bicycle and—in particular—regardless of the configuration of the front fork of the bicycle.

In particular, it should be noted that the connecting flange provided on a bicycle fork for connection of the brake caliper support is—in fact—a standard feature in the field of bicycles equipped with a disc brake caliper. The adapter support of the invention can be configured to be connected to this standard connecting flange which is provided on the fork for attachment of the brake caliper. The invention, therefore, solves the problem of a simple and efficient assembling of the ABS system without involving any modification of the fork arm.

Another advantage of the solution according to the invention consists in that said single adapter support may be mounted in a position strictly adjacent to the disc brake caliper, which also makes it extremely simple to provide a connection pipe between the ABS system and the cylinder actuator of the brake caliper and also the connection between the ABS system and the operating device associated with the brake lever.

DETAILED DESCRIPTION OF A PREFERRED EMBODIMENT

Further characteristics and advantages of the invention will become apparent from the description that follows with reference to the attached drawings, provided purely by way of non-limiting example, wherein.

Figure 1:
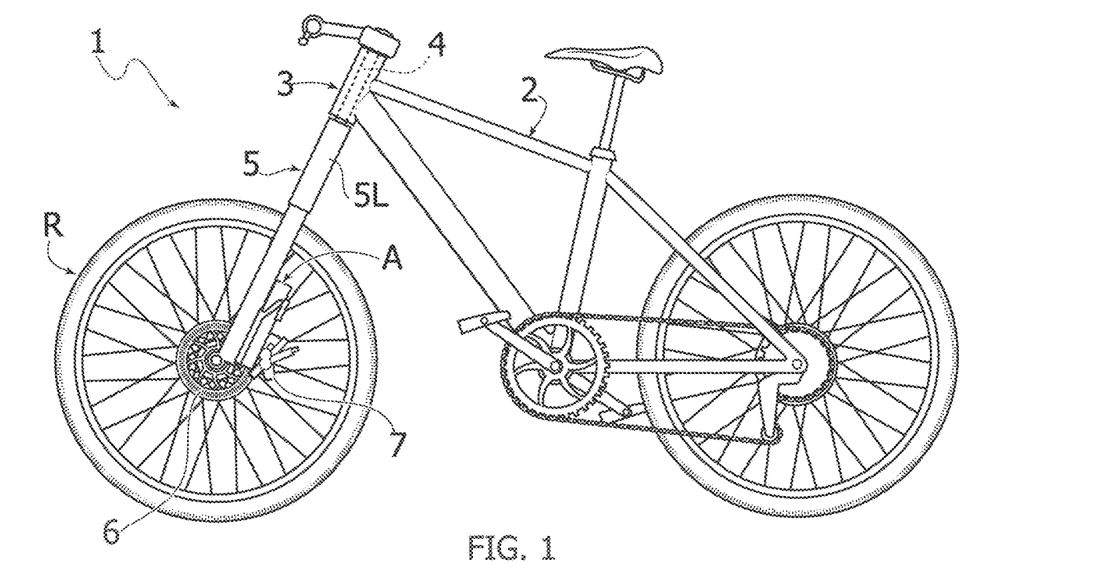
FIG. 1 is a schematic side view of a bicycle to which the device according to the invention is applied.

In FIG. 1, the reference number 1 indicates a bicycle on which the device according to the invention is applied. The bicycle configuration shown in FIG. 1 is provided purely by way of example, since the device of the invention is applicable to any bicycle, regardless of its configuration, and—in particular—regardless of the configuration of the front fork.

According to the conventional art, the bicycle 1, which may be, for example, an electrically-assisted pedal bicycle, comprises a frame 2 including a steering tube 3 within which a steering shaft 4 is rotatably mounted. The steering shaft 4 is connected in rotation with a front fork 5 comprising a pair of arms 5L, 5R (see also FIG. 2). Still according to the conventional technique, the lower ends of the two arms 5L, 5R support the front wheel R of the bicycle in rotation.

Associated with the hub of the front wheel R is a brake disc 6, cooperating with a disc brake caliper 7.

Figure 4:
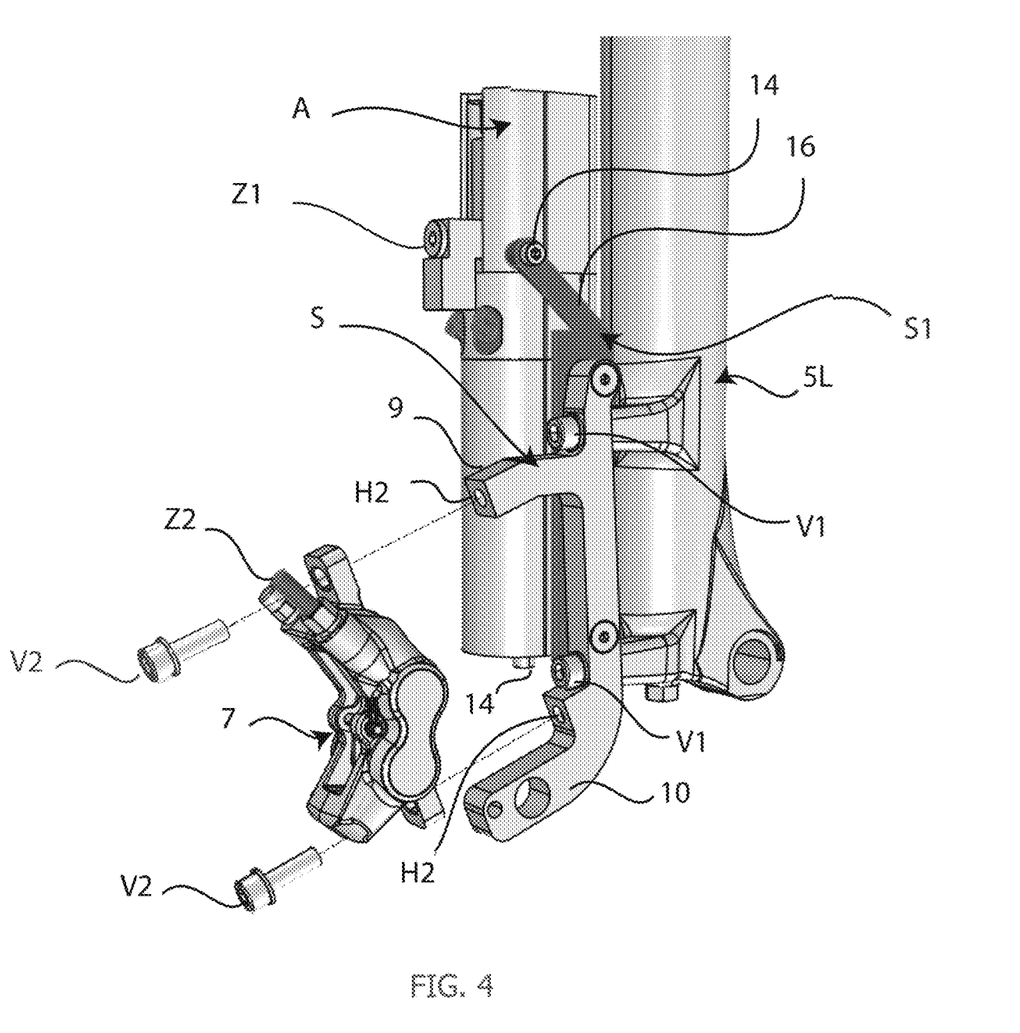
FIG. 4 is an exploded perspective view of the device of FIGS. 2, 3.

The disc brake caliper body 7 is mounted on one of the front fork arms 5 by means of an adapter support S (see FIG. 4 in particular), which acts as a spacer, in order to arrange the brake caliper body 7 at a distance from the front wheel axle, adequate to be able to cooperate correctly with the brake disc 6.

Figure 5:
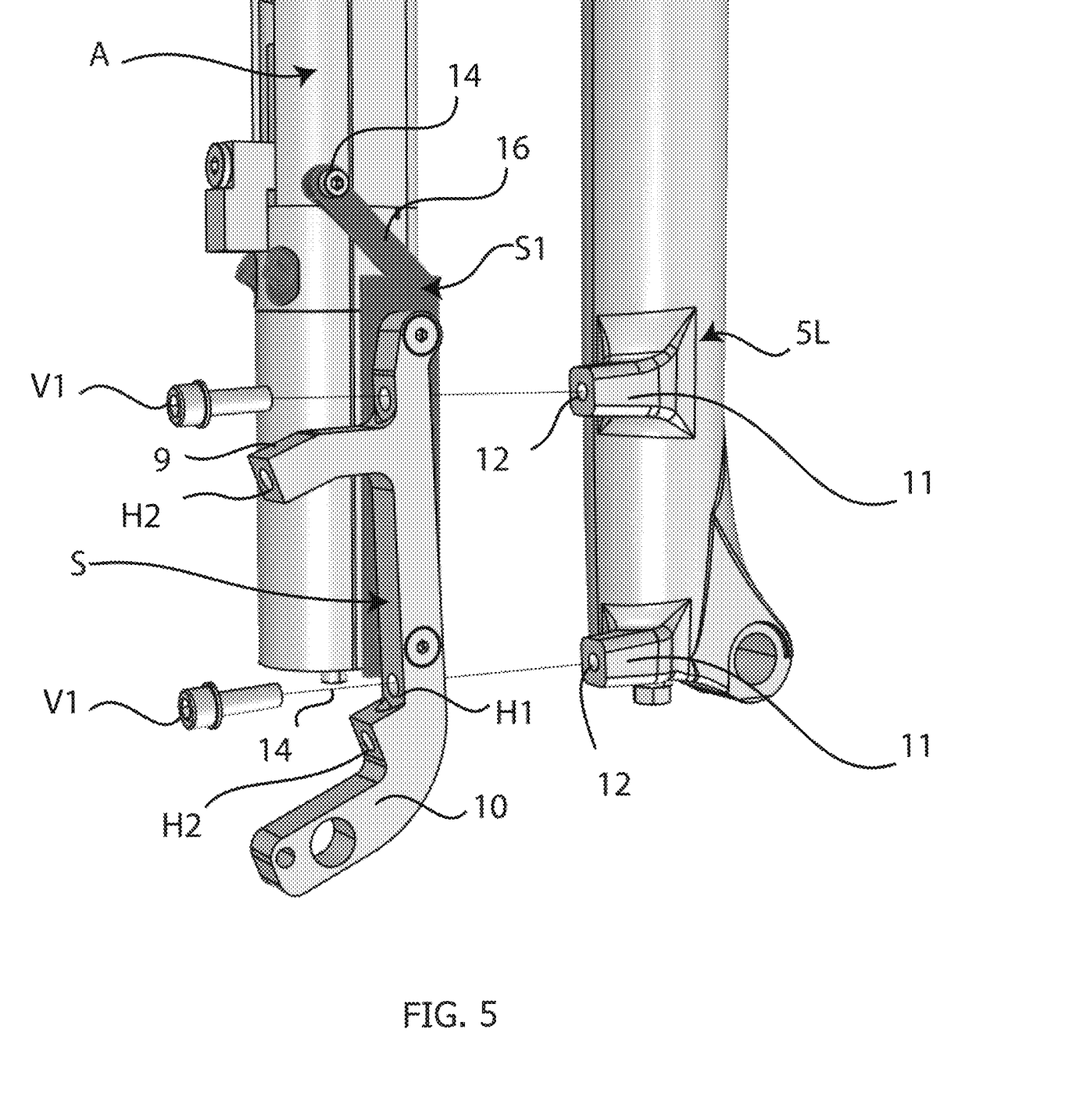
FIG. 5 is another exploded perspective view, where the disc brake caliper has been removed.

With reference in particular to FIG. 5, in the illustrated example, the adapter support S has a main portion 8 configured as an elongated bar (in the example, with a quadrangular cross-section), with an upper end head 9 and a lower end head 10 (with reference to the orientation of the support S in the assembled condition). Each of the two end heads 9, 10 has a first through-hole H1 for engagement of a screw V1, which secures the support S to the fork arm 5L. For this purpose, the fork arm 5L has, in the illustrated example, two protruding portions 11 with threaded blind holes 12 for receiving the screws V1.

It should be noted that the present invention is applicable to any bicycle equipped with a brake caliper mounted on a fork arm by means of an adapter support. The invention, therefore, does not require any modification of the bicycle or, in particular, of the front fork arm, since the configuration already provided for mounting the brake caliper is used.

With reference again to FIG. 4, the end heads 9, 10 of the adapter support S each have a hole H2, in the example—a threaded blind hole—for engagement of a respective screw V2 that secures the body of the brake caliper to the adapter support S.

In the drawings, reference A indicates—in its entirety—an ABS system associated with the disc brake caliper 7.

In the present description, and in the following claims, the term "ABS system" means a hydraulic control device, operatively interposed between a master hydraulic cylinder associated with a bicycle lever for actuating the brake and the actuating cylinder of the brake caliper 7, in order to control and reduce the fluid pressure supplied to the actuating cylinder of the caliper 7 when a tendency of the front wheel to lock is detected during braking.

The idea behind the present invention is to use the adapter support S, already provided in a bicycle to support the body of the brake caliper 7, to also support the body of the actuator A.

Figure 6:
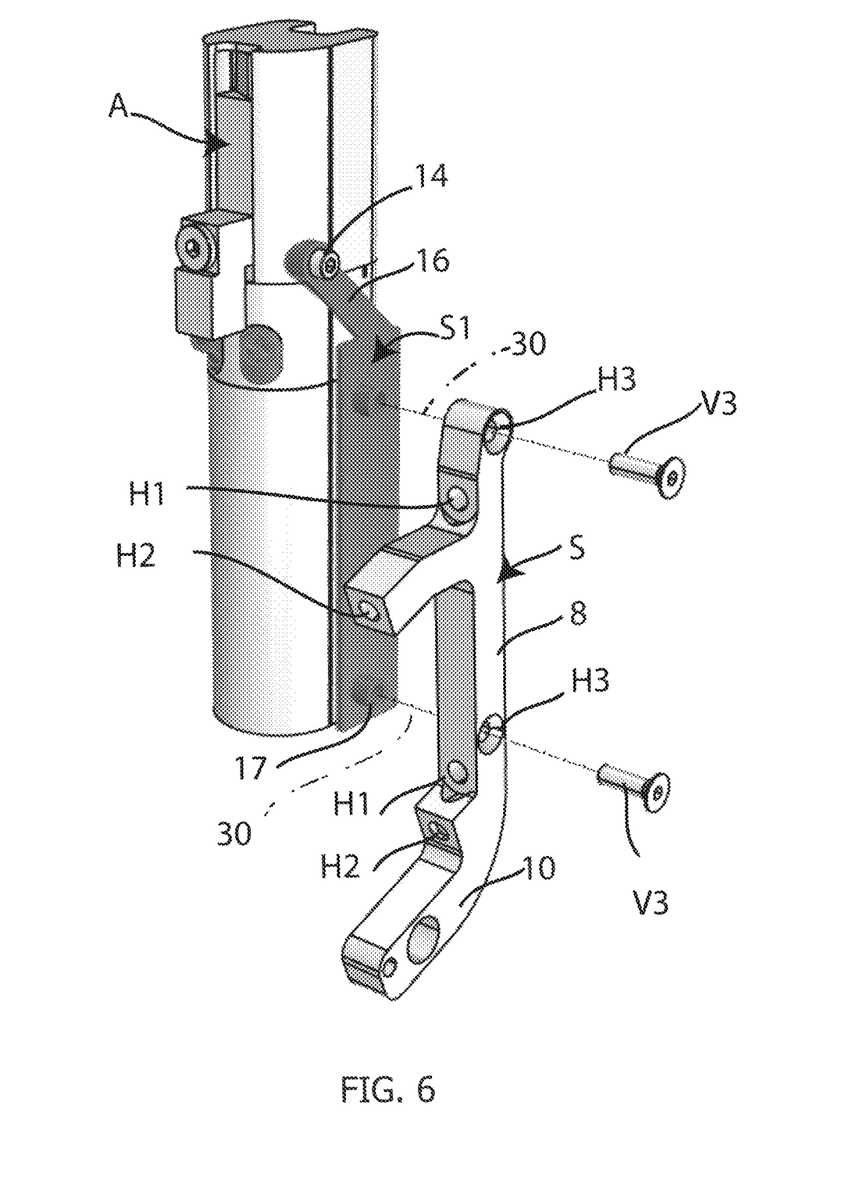
FIG. 6 is another exploded perspective view showing only the ABS system and the adapter support.
Figure 7:
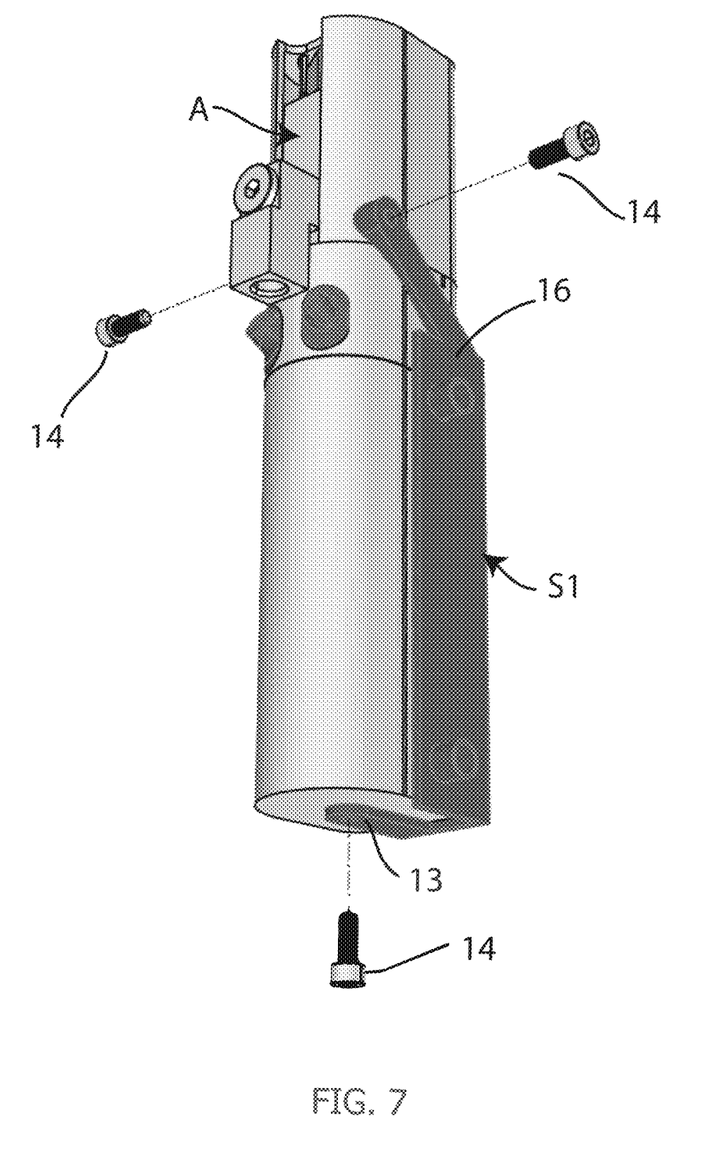
FIG. 7 is a perspective view of the ABS system, equipped with the auxiliary adapter that allows it to be connected to the aforesaid adapter support.

With reference to FIG. 6, in the exemplary embodiment illustrated herein, each of the end heads 9, 10 of the adapter support S has a third hole H3 (in the example a through-hole) for engagement of a respective screw V3 serving for securing the body of the ABS system A to the adapter support S. With reference again to FIG. 6, in the example illustrated, in each of the end heads 9, 10 of the support S, the third hole H3 has an axis 30 substantially orthogonal and spaced apart from the axis of the first hole H1 with respect to the axis of the second hole H2.

Also with reference to the specific illustrated example, the body of the actuator A has an elongated cylindrical shape. Consequently, in order to allow the connection by means of the screws V3, an auxiliary adapter S1 is associated with the body of the actuator A which—in the example—has a cylindrical half-shell configuration partially surrounding the body of the actuator A, and provided with two upper side ears 16 and a lower ear 13, which are respectively secured to the two sides of the actuator body A and to the bottom surface of the actuator A by means of screws 14.

With reference to FIG. 6, the auxiliary adapter S1 has—at least on one side—two protruding portions 17 prepared with threaded blind holes that receive the respective screws V3, to make a rigid connection of the actuator A to the adapter support S.

As is evident from the above description, the invention uses a component already present on the bicycle, i.e. the adapter support S designed to support the disc brake caliper, for mounting the ABS system A. To this end, it is therefore necessary to only reconfigure the adapter support S in order to provide it for mounting the actuator A, without any need to modify the bicycle and—in particular—the front fork arm of the bicycle, and without requiring a new design of the device according to the type of bicycle to which it is intended.

Figure 2:
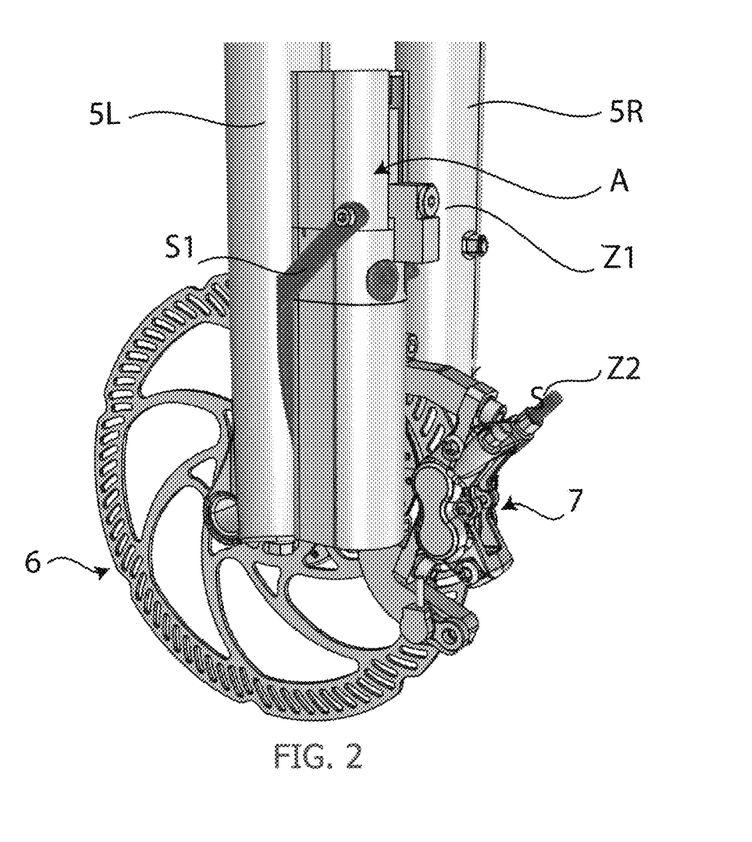
FIGS. 2, 3 are two perspective views on an enlarged scale of the support device of the ABS system according to the present invention, in an embodiment example.
Figure 3:
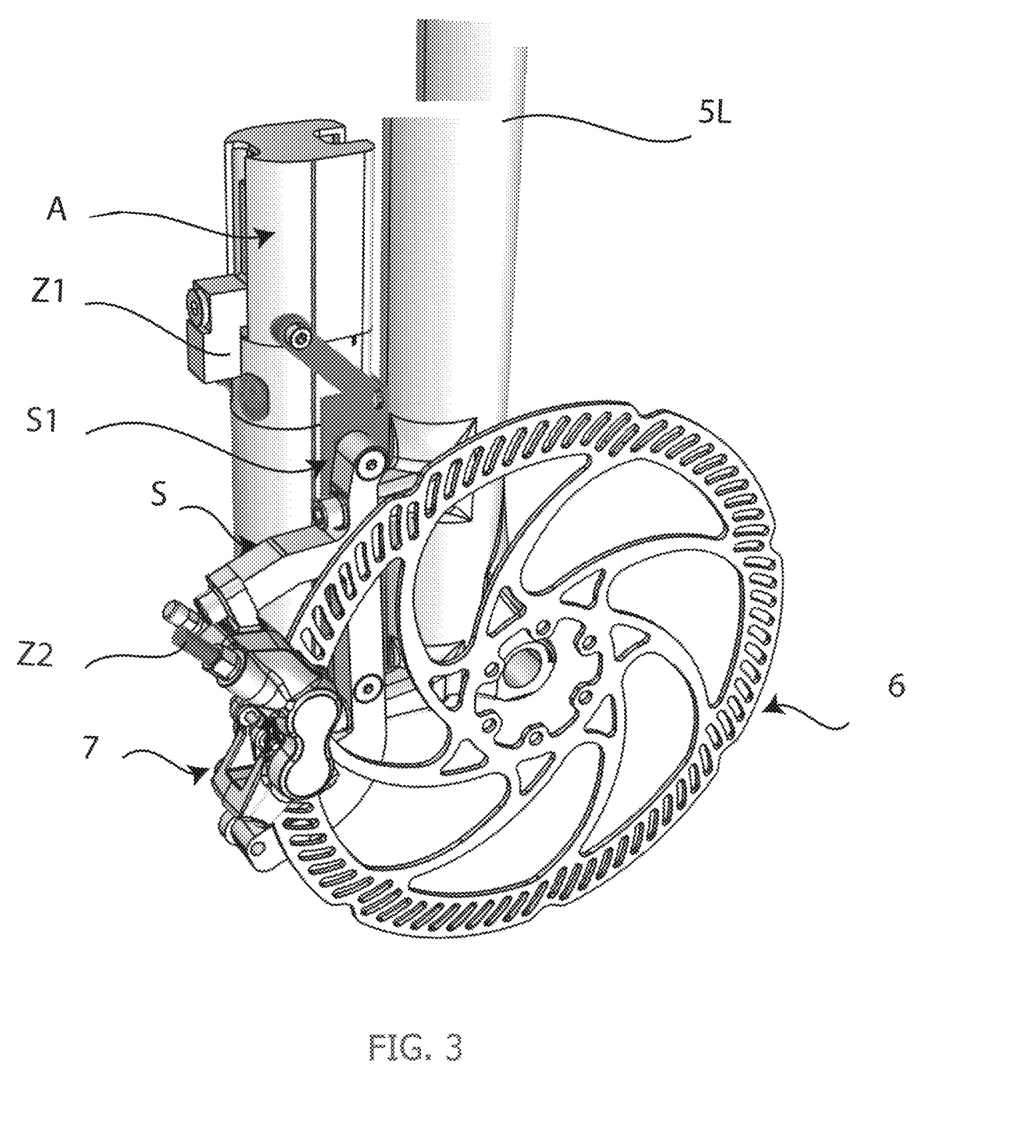

As can be seen from FIGS. 2, 3, the ABS actuator A is supported in a position strictly adjacent to the disc brake caliper, which makes it extremely simple to prepare a hydraulic connection pipe between the outlet (indicated with Z1 in FIG. 2) of the actuator A and the inlet (indicated with Z2 in FIG. 2) of the brake caliper 7 that communicates with the actuator cylinder of the caliper. With reference again to FIG. 5, in the specific illustrated example, the lower end head 10 of the adapter support S is provided with additional through-holes 15 serving for assembling a sensor intended to cooperate with the disc 6 of the disc brake in order to detect the rotation speed of the bicycle wheel. In an application example, the signal of this sensor signal is used by the electronic controller of the ABS actuator to activate the ABS function when a tendency of the front wheel to lock during braking or a tendency of the rear wheel to lift is detected.

Naturally, without prejudice to the principle of the invention, the details of construction and the embodiments may vary widely with respect to those described and illustrated purely by way of example.

In particular, it is evident that the specific configuration of the adapter support S that has been illustrated here has been provided purely by way of example. The configuration of the adapter support S can vary widely, depending on the characteristics of a specific application and—in particular—on the characteristics of the fork and the brake disc.

Furthermore, although the embodiment illustrated here makes use of screws for connecting the body of the ABS system A to the adapter support S, it is evident that any other known connection technique can be used.

The invention claimed is:

1. A support device, configured to support-on a fork arm of a bicycle-both a caliper of a disc brake associated with a bicycle wheel, and an ABS system in the form of a hydraulic control device, intended to be operatively interposed between a master hydraulic cylinder associated with a bicycle lever for actuating the brake and an actuator cylinder of the brake caliper, in order to control and reduce the fluid pressure supplied to the actuating cylinder of the brake caliper when a tendency to wheel locking and/or an incipient overturning of the bicycle is detected during braking,
wherein said support device comprises:
at least one first connection portion for connecting to a bicycle fork arm,
at least one second connection portion for connecting to a body of a disc brake caliper, and
at least one third connection portion for connecting to said ABS system,
said at least one first connecting portion, said at least one second connecting portion and said at least one third connecting portion all-all being part of a single adapter support which can be removably connected to the fork arm, and configured to removably support both the caliper body of the disc brake and the ABS system;
an auxiliary adapter, configured to be mounted on be body of said ABS system, and for being connected to said adapter support in such a way as to act as a connection element between said adapter support and the body of the ABS system.

2. A support device according to claim 1, wherein said adapter support is in the form of an elongated bar, said adapter support having an upper end head and a lower end head when said adapter support is mounted on a fork arm, and
each of the two end heads has a first hole (H1) for engagement of a screw for attaching the adapter support to the fork arm of the bicycle, a second hole for engagement of a screw for attaching the body of the disc brake caliper to the adapter support, and a third hole for engagement of a screw for attaching the body of said ABS system to said adapter support.

3. A support device according to claim 2, wherein an axis of said third hole is substantially orthogonal to an axis of said first hole.

4. A support device according to claim 1, wherein:
said single adapter support has said at least one first connection portion which has at least one hole for engagement of a screw to attach the adapter support to the fork arm of the bicycle,
said single adapter support has said at least one second connection portion which has at least one hole for engagement of a screw to attach the body of the disc brake caliper to the adapter support, and
said single adapter support has said at least one third connection portion which has at least one hole for engagement of a screw to attach a body of said ABS system to said adapter support.

5. A support device according to claim 1, wherein said auxiliary adapter is in the form of a shell configured to at least partially surround the body of the ABS system, and provided with first connecting portions configured for connection to the body of the ABS system, and with second connecting portions configured for connection to the adapter support.

6. A bicycle, comprising a support device according to claim 1.

7. A method for mounting a disc brake caliper and an ABS system in the form of a hydraulic control device, on a fork arm of a bicycle,
the body of the ABS system and the body of the disc brake caliper mounted on the fork arm by means of a support device according to claim 1.

* * * * *